(12) United States Patent
Herrig et al.

(10) Patent No.: US 7,199,704 B2
(45) Date of Patent: Apr. 3, 2007

(54) VEHICULAR FLASHER UNIT HAVING SELECTABLE FLASHER SCHEMES ILLUMINATED WITH PULSE WIDTH MODULATED SIGNALS

(75) Inventors: Hanz Werner Herrig, Aurora, IL (US); Dean Craig Holle, St. Charles, IL (US)

(73) Assignee: Xtreme Engineered Solutions, Inc., St. Charles, IL (US)

( * ) Notice: Subject to any disclaimer, the term of this patent is extended or adjusted under 35 U.S.C. 154(b) by 0 days.

(21) Appl. No.: 11/250,736

(22) Filed: Oct. 14, 2005

(65) Prior Publication Data

US 2006/0091817 A1  May 4, 2006

Related U.S. Application Data

(60) Provisional application No. 60/619,441, filed on Oct. 15, 2004.

(51) Int. Cl.
*B60Q 1/52* (2006.01)
(52) U.S. Cl. .................... 340/471; 340/479; 315/77; 315/200 A
(58) Field of Classification Search ............. 340/815.4
See application file for complete search history.

(56) References Cited

U.S. PATENT DOCUMENTS

| | | |
|---|---|---|
| 3,319,073 A | 5/1967 | Wrin |
| 4,173,013 A | 10/1979 | Spiteri |
| 4,227,174 A | 10/1980 | Belcher et al. |
| 4,302,748 A | 11/1981 | Gant |
| 4,348,655 A | 9/1982 | Goertler et al. |
| 4,380,753 A | 4/1983 | Gant |
| 4,692,736 A | 9/1987 | Crisci |
| 5,072,210 A | 12/1991 | Kimmelman |
| 5,247,280 A | 9/1993 | Brooks |
| 5,309,142 A | 5/1994 | Fritz |
| 5,414,407 A | 5/1995 | Gerrans et al. |
| 5,631,625 A | 5/1997 | Moergelin et al. |

(Continued)

*Primary Examiner*—Daniel Wu
*Assistant Examiner*—George A. Bugg
(74) *Attorney, Agent, or Firm*—John J. Oskorep, Esq.

(57) ABSTRACT

In one illustrative example, a vehicular flasher unit has control circuitry; memory which is accessible by the control circuitry and having a plurality of pulse width modulation (PWM) flasher scheme data sets stored therein which correspond to a plurality of flasher schemes for vehicle flasher lights of a vehicle; a flasher scheme selection input to the control circuitry; a flasher enable input to the control circuitry which enables a flasher scheme in the vehicular flasher lights; and a light illumination output from the control circuitry which controls illumination of the vehicle flasher lights. The control circuitry is operative to select a set of PWM flasher scheme data from the plurality of PWM flasher scheme data sets stored in the memory in accordance with a flasher scheme selection input signal identified at the flasher scheme selection input; monitor the flasher enable input to identify a flasher enable signal; and produce, at the light illumination output in response to identifying a flasher enable signal at the flasher enable input, a pulse width modulated signal in accordance with the selected set of PWM flashing scheme data for illuminating a flasher scheme in the vehicle flasher lights. Preferably, the set of PWM flasher scheme data is a set of PWM heartbeat scheme data corresponding to a heartbeat flashing scheme in the vehicle flasher lights. Several safety and convenience features are further provided in the vehicular flasher unit.

24 Claims, 8 Drawing Sheets

U.S. PATENT DOCUMENTS

| | | | |
|---|---|---|---|
| 5,736,925 A * | 4/1998 | Knauff et al. | 340/468 |
| 5,801,623 A | 9/1998 | Chen et al. | |
| 5,805,061 A | 9/1998 | Fritz et al. | |
| 6,069,559 A | 5/2000 | Davis et al. | |
| 6,087,932 A | 7/2000 | Belgard | |
| 6,236,311 B1 | 5/2001 | Anderson | |
| 6,243,009 B1 | 6/2001 | Fritz et al. | |
| 6,515,584 B2 * | 2/2003 | DeYoung | 340/475 |
| 6,552,492 B2 * | 4/2003 | Kover et al. | 315/77 |
| 6,842,111 B1 | 1/2005 | Smithson | |
| 2002/0105423 A1 * | 8/2002 | Rast | 340/479 |
| 2002/0190847 A1 * | 12/2002 | Armstrong | 340/425.5 |
| 2002/0195947 A1 | 12/2002 | Doczy et al. | |
| 2004/0095234 A1 | 5/2004 | Sugimoto et al. | |
| 2004/0100373 A1 | 5/2004 | Ponziani | |

* cited by examiner

VEHICULAR FLASHER UNIT HAVING SELECTABLE FLASHER SCHEMES ILLUMINATED WITH PULSE WIDTH MODULATED SIGNALS

CROSS-REFERENCE TO RELATED APPLICATION

This patent application claims priority to U.S. provisional patent application having Ser. No. 60/619,441 entitled "Programmable Automotive Turn Signal Flasher (PATSF)" having a filing date of 15 Oct. 2004, which is hereby incorporated by reference herein.

BACKGROUND

1. Field of the Technology

The present application relates generally to vehicular flasher units for illuminating vehicle flasher lights (e.g. turn signal flashers) for vehicles (e.g. automobiles), and more particularly to vehicular flasher units having selectable flasher schemes which utilize pulse width modulated (PWM) signals to illuminate the vehicle flasher lights, where one of the flasher schemes includes a "heartbeat" pattern flasher scheme.

2. Description of the Related Art

A vehicular flasher unit in an engine-propelled ground-based vehicle (e.g. an automobile) is used to provide left/right hand turn signaling or emergency hazard signaling. The vehicular flasher unit typically includes a bi-metal switch and/or hybrid relay devices. These types of flasher units are inflexible in many ways.

What is needed is an intelligent vehicular flasher unit that is operative to produce distinctive, user-selectable flash patterns. Some of these flash patterns should be interesting or attractive to vehicle operators. The vehicular flasher unit should further be designed so it can control both turn signal lamps and emergency hazard lamps, thereby reducing cost and complexity of a wiring harness of the vehicle. The unit should be further adapted to drive either incandescent lamps or light-emitting diodes (LEDs) in an appropriate manner. Safety features (e.g. increasing turn signal and emergency hazard warning visibility) should further be provided.

SUMMARY

The present application relates generally to vehicular flasher units for illuminating vehicle flasher lights (e.g. turn signal flashers) for vehicles (e.g. automobiles, buses, and trucks). More particularly, the present application relates to vehicular flasher units having selectable flasher schemes which utilize pulse width modulated signals to illuminate the vehicle flasher lights, preferably where one of the flasher schemes includes a heartbeat pattern flasher scheme.

In one illustrative example of the present application, a vehicular flasher unit has control circuitry; memory which is accessible by the control circuitry and having a plurality of pulse width modulation (PWM) flasher scheme data sets stored therein which correspond to a plurality of flasher schemes for a vehicle flasher light; a flasher scheme selection input to the control circuitry; a flasher enable input to the control circuitry which enables a flasher scheme in the vehicular flasher light; and a light illumination output from the control circuitry which controls illumination of the vehicle flasher light. Flasher enable signals at the flasher enable input may be driven by a current sense circuit for detecting different lamp load currents which correspond to different switch actuations and/or status conditions (e.g. actuation of left/right hand turn signal switch, emergency hazard signal switch, or "bulb out" conditions). The control circuitry is operative to select a set of PWM flasher scheme data from the plurality of PWM flasher scheme data sets stored in the memory in accordance with a flasher scheme selection input signal identified at the flasher scheme selection input; monitor the flasher enable input to identify a flasher enable signal; and produce, at the light illumination output in response to identifying a flasher enable signal at the flasher enable input, a pulse width modulated signal in accordance with the selected and stored set of PWM flashing scheme data for illuminating a flasher scheme in the vehicle flasher light.

Preferably, the set of PWM flasher scheme data is a set of PWM heartbeat scheme data corresponding to a heartbeat flashing scheme in the vehicle flasher light. The heartbeat flashing scheme is a repeating sequence of two pulse flashes in the vehicle flasher lights which include a first-half heartbeat pulse flash and a second-half heartbeat pulse flash. Each first-half heartbeat pulse flash has a first intensity in the vehicle flasher lights and each second-half heartbeat pulse flash having a second intensity in the vehicle flasher lights that is different from (e.g. less than) the first intensity. Each first-half heartbeat pulse flash is separated from each subsequent second-half heartbeat pulse flash by a first duration and each second-half heartbeat pulse flash is separated from each subsequent first-half heartbeat pulse by a second duration that is different from (e.g. greater than) the first duration. However, the set of PWM flasher scheme data stored in memory is not limited to the above-mentioned PWM heartbeat flasher scheme; a variety of distinctive user selectable PWM flasher schemes may be stored in the memory.

Various other features are also provided as described in detail in the detailed description of the preferred embodiments.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Figure 1:
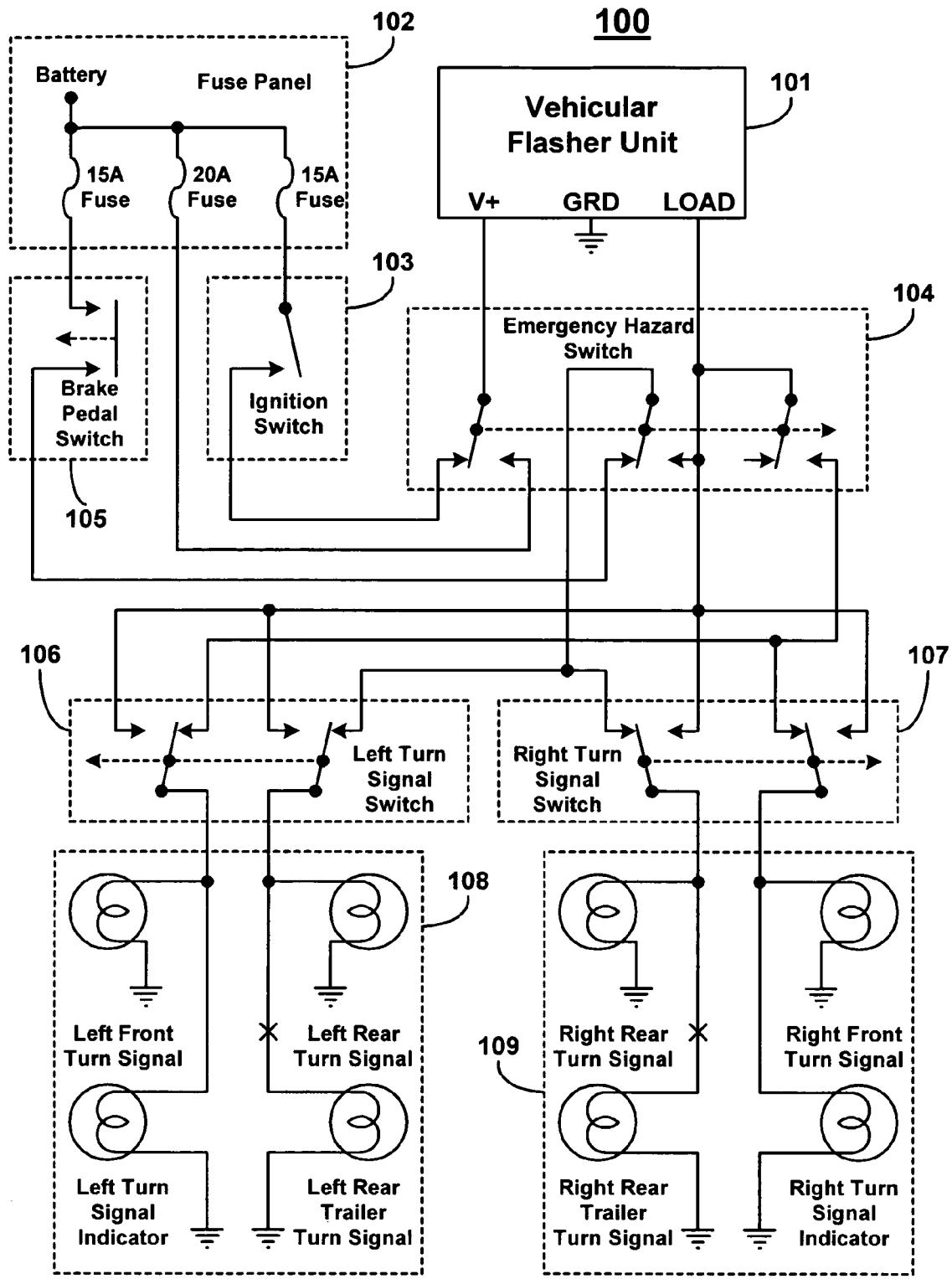
FIG. 1 is a basic system diagram of a vehicular flasher system of a vehicle (e.g. an automobile) which includes a vehicular flasher unit of the present application.

The present application relates to a vehicular flasher unit having user selectable flasher schemes stored in memory which illuminate vehicle flasher lights using pulse width modulated (PWM) signals. In one particular example, the vehicular flasher unit has control circuitry; memory which is accessible by the control circuitry and has a plurality of PWM flasher scheme data sets stored therein which correspond to a plurality of flasher schemes for a vehicle flasher light; a flasher scheme selection input to the control circuitry; a flasher enable input to the control circuitry which enables a flasher scheme in the vehicular flasher light; and a light illumination output from the control circuitry which controls illumination of the vehicle flasher light. Flasher enable signals at the flasher enable input may be driven by a current sense circuit for detecting different lamp load currents which correspond to different switch actuations and/or status conditions (e.g. actuation of left/right hand turn signal switch, emergency hazard signal switch, or "bulb out" conditions). The control circuitry is operative to select a set of PWM flasher scheme data from the plurality of PWM flasher scheme data sets stored in the memory in accordance with a flasher scheme selection input signal identified at the flasher scheme selection input; monitor the flasher enable input to identify a flasher enable signal; and produce, at the light illumination output in response to identifying a flasher enable signal at the flasher enable input, a pulse width modulated signal in accordance with the selected and stored set of PWM flashing scheme data for illuminating a flasher scheme in the vehicle flasher light. Preferably, the set of PWM flasher scheme data is a set of PWM heartbeat scheme data corresponding to a heartbeat flashing scheme in the vehicle flasher light. The heartbeat flashing scheme is a repeating sequence of two pulse flashes in the vehicle flasher lights which include a first-half heartbeat pulse flash and a second-half heartbeat pulse flash. Each first-half heartbeat pulse flash has a first intensity in the vehicle flasher lights and each second-half heartbeat pulse flash has a second intensity in the vehicle flasher lights that is different from (e.g. less than) the first intensity. Each first-half heartbeat pulse flash is separated from each subsequent second-half heartbeat pulse flash by a first duration and each second-half heartbeat pulse flash is separated from each subsequent first-half heartbeat pulse by a second duration that is different from (e.g. greater than) the first duration. However, the set of PWM flasher scheme data stored in memory is not limited to the above-mentioned PWM heartbeat flasher scheme; a variety of distinctive user selectable PWM flasher schemes may be stored in the memory. Other advantageous features are provided as described in detail below.

A vehicular flasher unit of the present application is a one-for-one replacement unit of existing turn signal and/or emergency hazard flasher units which are currently installed in all types of engine-propelled ground-based vehicles (e.g. automobiles). The vehicular flasher unit may replace existing bi-metal switch and/or hybrid relay turn signal flasher units used to control automotive turn signal and/or hazard lamps. It is designed so it can easily be retrofitted into existing types of vehicles, which includes automobiles, buses, motorcycles and trucks. The vehicular flasher unit is operative to produce distinctive, user-selectable, turn-on and turn-off flash patterns. This increases safety by increasing turn signal and emergency hazard warning visibility. The vehicular flasher unit is also designed so it can control both the turn signal lamps and the emergency hazard lamps with a single flasher unit, thereby reducing cost and complexity of the vehicle's wiring harness.

The vehicular flasher unit includes control circuitry which will produce a variety of turn signal flash sequences capable of appropriately driving the signal lamps, whether they are incandescent-type or light-emitting diode (LED) type lamps. The control circuitry may store or access from memory one of a plurality of distinct flasher schemes or patterns. The patterns may include, for example, a "standard" or traditional single-pulse ON-OFF flash pattern, an emergency hazard flash pattern, and/or one or more "heartbeat" or heartbeat-like flash patterns. The end user is able to select the standard flash pattern or one of several custom pre-programmed heartbeat or heartbeat-like turn signal patterns by actuating a user switch (e.g. a push button switch) exposed on the housing unit of the vehicular flasher unit. Within certain legal, safety, and engineering limits, an automotive manufacturer or an individual may request a vehicular flasher unit which has one or more custom flash patterns. As apparent, a vehicular flasher unit of the present application is pre-programmed to produce one or more distinct flash patterns (schemes or sequences), designed to meet the requirements of the manufacturer or customer.

As described, one of the flash patterns may be a heartbeat flash pattern. The heartbeat flash pattern is a continually repeating pulse sequence where the turn signal lamps are gradually turned ON to full-intensity for a medium length of time, then gradually turned OFF to a minimal intensity for a short period of time, then are turned ON to a medium-intensity for a short period of time, and then gradually turned OFF to a minimal intensity and left OFF a relatively longer period of time. Such flash patterns will be described in more detail later in relation to FIGS. 7(a)–7(c). The different heartbeat flasher schemes and other schemes are stored in memory of the vehicular flasher unit. The ON-OFF-ON-OFF sequence may have a period of about one cycle per second, or approximately 1 Hertz (Hz). Variations of the scheme include different lamp ON times, different lamp OFF times, different lamp ON intensities, and the number of times the lamps turn ON-OFF during a flash sequence cycle, as examples.

The intensity of the lamps is determined by the current allowed to flow through the lamps over a predetermined time period. One general approach to adjust the intensity of lamps is to increase the continuous current flow through the lamp by increasing the voltage across it. However, this requires the use of a voltage adjustable power source to drive the lamp. According to the present application, the intensity of the lamps is controlled with use of Pulse Width Modulation (PWM). For automotive applications, the PWM approach is more efficient because it does not require the introduction of a voltage adjustable power source to drive the lamps. This is further advantageous when LEDs are utilized, as the control circuitry makes the LED flashes appear to have gradually increasing and decreasing intensities through use of PWM, which imitates the turn-on and turn-off characteristics of incandescent lamps, whether standard flash patterns or other (heartbeat) patterns are utilized.

FIG. 1 is a basic system diagram of a vehicular flasher system 100 for a vehicle (e.g. an automobile) which includes a vehicular flasher unit 101 of the present application. In FIG. 1, vehicular flasher system 100 utilizes a common wiring diagram utilized when vehicular flasher unit 101 is provided for both turn signal and emergency hazard signal activation in the automobile.

The major components in FIG. 1 are vehicular flasher unit 101, a fuse panel 102, an ignition switch 103, an emergency hazard switch 104, a brake pedal switch 105, a left hand turn signal switch 106, a right hand turn signal switch 107, left hand turn signal and indicator lamps 108, and right hand turn signal and indicator lamps 109. A vehicle battery provides electrical power to the components through fuse panel 102. Components 102, 103, 104, 105, 106, 107, 108, and 109 are typically provided and installed as fixed components of the automobile. Vehicular flasher unit 101 is typically an electro-mechanical component which may be prone to wear and failures, and is therefore generally installed as a replaceable and/or serviceable component of the automobile. This allows for easy after-market installation.

Power to vehicular flasher unit 101 is provided through ignition switch 103 from the battery. For a two-bulb system (i.e. one front and one rear turn signal bulb per side), this power feed is generally protected with a 15-Amp fuse located within fuse panel 102. The fuse is sized to provide power to either left/right hand turn signal lamps 108/109 when activated. Power is also provided to vehicular flasher unit 101 through emergency hazard switch 104. For the two-bulb system, this power feed is generally protected with a 20-Amp fuse located within fuse panel 102. This fuse is sized to provide power to both left/right hand turn signal lamps 108/109. The number and power rating of lamps associated with left/right hand turn signal lamps 108/109 and the current rating of the associated fuses vary depending on the vehicle design. The following example lamp configurations may be associated with left/right hand turn signal lamps 108/109: (1) one or two front turn signal lamps per side; (2) one or two rear turn signal lamps per side; (3) one trailer turn signal lamps per side; (4) one dashboard turn signal indicator lamp per side (1.3 to 2.5 Watts each); and (5) one side panel lamp per side (3.5 to 5 Watts each). For (1), (2), and (3) above, note that an aggregate limit of three vehicle turn signal lamps plus one trailer turn signal lamp per side exits when the wire harness of emergency hazard switch 104 is designed for a maximum load current of 20 amps. An alternative configuration of vehicular flasher unit 101 may be utilized to handle the load of additional lamps if the vehicle wire harness and fuse panel are properly sized for the higher load current produced by a system having more than three vehicle turn signal lamps plus one trailer turn signal lamp per side.

Figure 2:
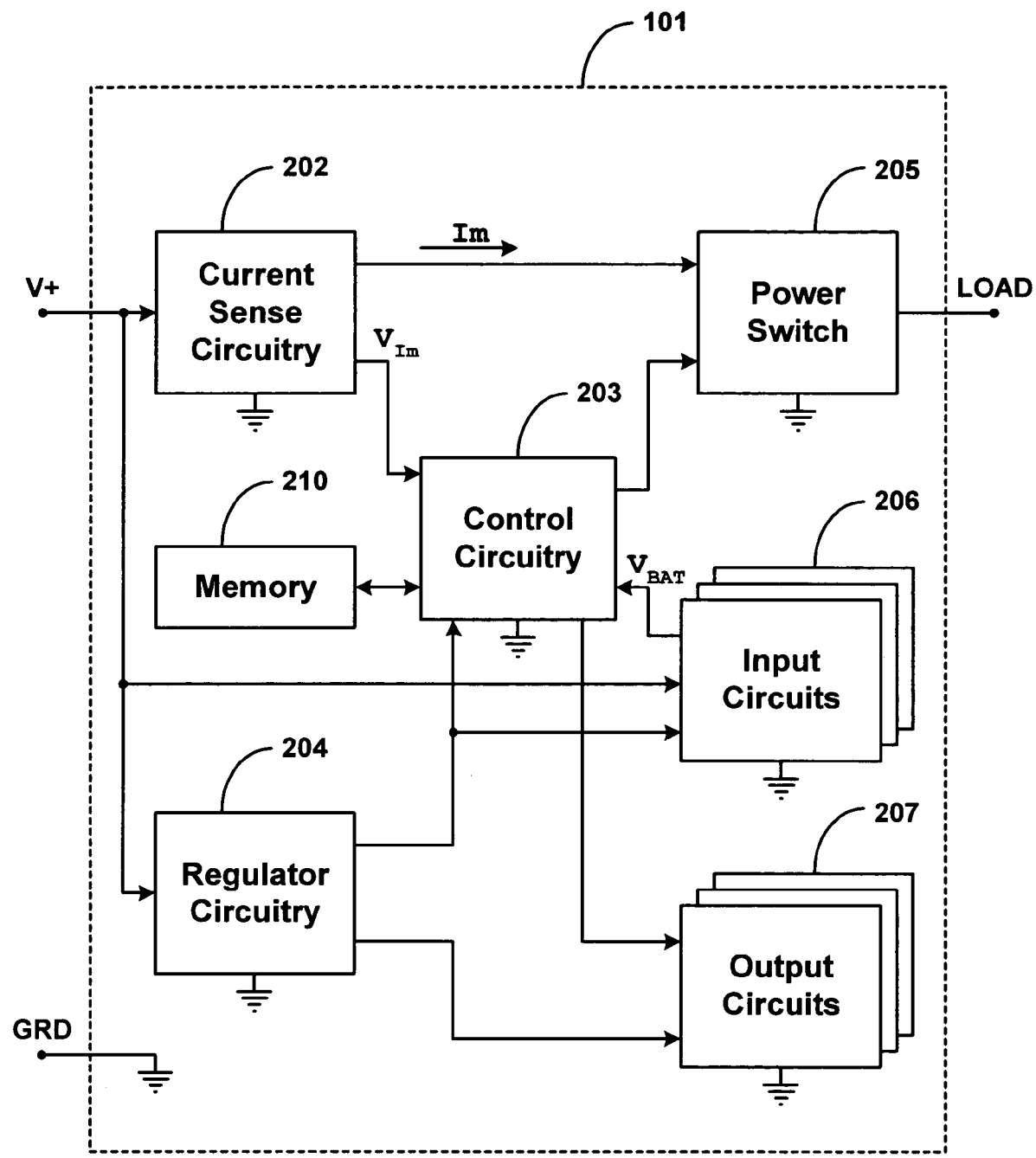
FIG. 2 is a basic schematic block diagram of the vehicular flasher unit of FIG. 1.

FIG. 2 is a basic schematic block diagram of vehicular flasher unit 101 of FIG. 1. Vehicular flasher unit 101 of FIG. 2 includes a current sense circuit 202, control circuitry 203 having access to a memory 210, regulator circuitry 204, a power switch 205, one or more input circuits 206 and one or more output circuits 207. As indicated in FIG. 2, vehicular flasher unit 101 also has three high-current wired connections. These are a voltage input terminal V+, a LOAD output terminal, and a ground reference terminal. The V+ terminal supplies power to vehicular flasher unit 101. The nominal voltage at the V+ terminal for automotive applications is generally +12 volts DC. The wire connected to the V+ terminal is properly rated and sized to safely handle short circuit currents needed to open a fuse used to protect the wire harness. The V+ voltage is the unregulated battery voltage of the vehicle. For a 12-volt system, this voltage varies from +11.5 volts DC to +14.5 volts DC. Fluctuations in voltage (i.e. reduction in voltage) are the result of activating accessories such as headlights, turn signal lamps, windshield wipers, air-conditioner, fans, window defoggers, power seats, and other automotive accessories. Regulator circuitry 204 is used to convert the V+ voltage to a clean, stable voltage used by various components of vehicular flasher unit 101 (e.g. control circuitry 203 and input and output circuits 206 and 207).

The LOAD terminal is coupled and supplies power to left/right hand turn signal lamps and/or emergency hazard lamps (i.e. the LOAD). The signals at the LOAD terminal are controlled by control circuitry 203 for producing the distinct ON-OFF flash sequences in the lamps. Responsive to signals from control circuitry 203, power switch 205 provides power to the lamps when a lamp switch is activated. Power switch 205 may be implemented with a semiconductor switch that is capable of switching power to the "LOAD" at the PWM frequency to produce the appropriate desired effects. The wire connected to the LOAD terminal is properly rated and sized to safely handle short circuit currents required to open the fuse used to protect the wire harness. The ground reference node supplies the frame ground reference to the circuit of vehicular flasher unit 101. Although the ground reference terminal handles relatively small amounts of current, the wire connected to this terminal is also properly rated and sized to safely handle internal fault currents needed to open the fuse used to protect the wire harness.

In general, input circuit 206 provides input stimulation or signals to control circuitry 203. The stimulation may be, for example, a trigger request to change the ON-OFF flash sequence, a trigger request to mute the audible warning tones produced by vehicular flasher unit 101, or to provide the value of the battery voltage to control circuitry 203, all via input circuit 206. Output circuit 207 is used to provide status, acknowledgement, or warning indications (e.g. indicator lamps or tones) which are driven by control circuitry 203. Control circuitry 203 also causes an audible alarm or acknowledgement sound via output circuit 207 to indicate that either a turn signal has been active beyond a set period to time, or that the ON-OFF flash sequence has been changed to the next sequence per the user request, or that a turn signal bulb has failed (see discussion later below).

Control circuitry 203 monitors input signals from input circuit 206 (a user control switch or button) for changing the active ON-OFF flash sequence to another different ON-OFF flash sequence from memory 210. The selection of the desired flash sequence may be performed either during the installation of vehicular flasher unit 101 or subsequently by the vehicle operator when the vehicle is parked in a safe location away from vehicle traffic. Vehicular flasher unit 101 produces the appropriate ON-OFF flash sequence or scheme in response to either the left/right hand turn signal switch or the emergency hazard switch being closed by the vehicle operator. Note that power switch 205 is typically closed, allowing current to flow to the LOAD when any of the lamp switches are closed by the vehicle operator. In response to an actuation of one of the lamp switches, control circuitry 203, triggered by the output of current sense circuit 202, controls power switch 205 in accordance with a selected pulse width modulated (PWM) signal to produce the corresponding ON-OFF flash sequence.

During each flash pattern selection process, current sense circuitry 202 provides an accurate measurement of a load current $I_M$ drawn by the properly working turn signal lamps to control circuitry 203. A voltage $V_{Im}$ which is proportional to this load current $I_M$ is sampled by control circuitry 203 and stored in memory 210 (non-volatile) as a threshold voltage $V_{TH}$ which is used for subsequent decision-making processes of control circuitry 203. During subsequent steady-state operation, the output of current sense circuitry 202 is used to determine the appropriate output response.

When control circuitry 203 detects little or no voltage relative to the threshold voltage $V_{TH}$, then no switches are actuated and no special conditions are present, and therefore no response is necessary. When control circuitry 203 detects a voltage $V_{Im}$ at the output which is about the same as the threshold voltage $V_{TH}$, then the left/right hand turn signal switch has been activated and the pre-selected flasher pattern is produced in response. When control circuitry 203 detects a voltage $V_{Im}$ at the output that is well above (e.g. twice) the threshold voltage $V_{TH}$, then the emergency hazard signal switch has been activated and the emergency hazard signal pattern is produced in response. When control circuitry 203 detects a voltage $V_{Im}$ at the output that is just below the threshold voltage $V_{TH}$, then the left/right hand turn signal switch has been activated but one or more bulbs have failed, and therefore a "bulb-out" flash pattern and an optional audible alert is produced in response. Preferably, the threshold voltage $V_{TH}$ utilized for switch detection is adjusted based on a battery voltage measurement to compensate for fluctuations in the battery voltage over time. That is, the threshold voltage $V_{TH}$ may be produced based on the initial threshold voltage (i.e. the initially-measured $V_{Im}$) which is adjusted in accordance with the battery voltage. This technique is described in more detail in relation to FIG. 3.

Figure 3:
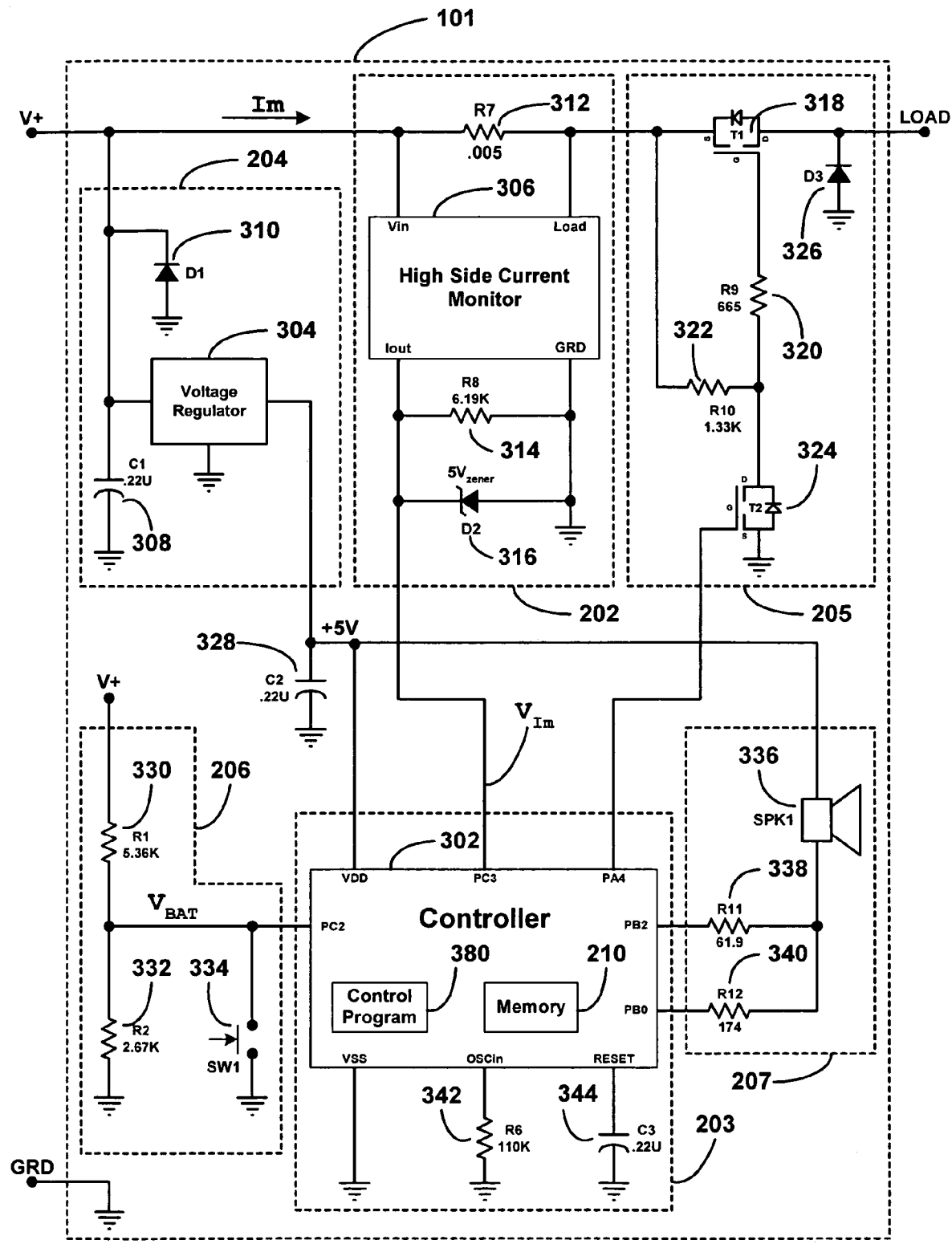
FIG. 3 is a schematic diagram of the vehicular flasher unit of FIGS. 1 and 2.

FIG. 3 is a detailed schematic diagram of vehicular flasher unit 101 of FIGS. 1 and 2 in a preferred embodiment. Components of control circuitry 203 of FIG. 3 include a controller 302 having a software program 380 and memory 210, a resistor (R6) 342, and a capacitor (C3) 344. Components of input circuits 206 of FIG. 3 include a resistor (R1) 330 and a resistor (R2) 332 of a voltage divider circuit, and a user selection switch (SW1) 334. Components of output circuits 207 of FIG. 3 include a speaker (SPK1) 336, a resistor (R11) 338, and a resistor (R12) 340. Components of regulator circuitry 204 of FIG. 3 include a voltage regulator device 304, a diode (D1) 310, and a capacitor (C1) 308. Components of current sense circuit 202 of FIG. 3 include a high side current monitor 306, a resistor (R7) 312, a resistor (R8) 314, and a zener diode (D2) 316. Finally, components of output circuits 205 of FIG. 3 include a transistor (T1) 318, a transistor (T2) 324, a resistor (R9) 320, a resistor (RIO) 322, and a diode (D3) 326. All components are coupled as shown in FIG. 3, and carried and contained within a housing unit (not revealed in FIG. 3).

Control circuitry 203 is implemented with use of a controller 302 which may be a microcontroller or microprocessor. The microcontroller is powered through regulator circuitry 204. In this embodiment, control circuitry 203 is implemented using a pre-programmed microcontroller which is a model ST62T62CB3 microcontroller from STMicroelectronics based in Geneva, Switzerland. Software program 380 stored within the microcontroller controls the general operation of vehicular flasher unit 101, and is particularly adapted to cause the selected one of a plurality of distinct ON-OFF flash sequences to be produced at a predetermined rate.

For setting a flasher sequence, the vehicle operator is instructed to keep the turn signal switch engaged while actuating user selection switch 334. At this time, the measured voltage $V_{Im}$ from the output of current sense circuitry 202 is stored by the microcontroller in memory 210 as the threshold voltage $V_{TH}$ which will be used to make subsequent steady-state operational decisions of vehicular flasher unit 101. For adjusting the threshold voltage $V_{TH}$ due to battery voltage fluctuations, the measured battery voltage $V_{BATT}$ is measured and stored in memory 210 as well. The microcontroller has analog-to-digital (A/D) converters which convert the analog signals at the input to obtain and stores the value. In this embodiment, current sense circuit 202 is implemented using a high side current monitor 306. High side current monitor 306 is adapted to monitor the voltage dropped across resistor 312. As the current flowing through resistor 312 increases, the voltage drop across resistor 312 increases. The microcontroller is designed to detect current flow in 0.0625 amp steps. Maximum current flow for vehicular flasher unit 101 is set to 16 amps (256 steps×0.0625 amps per steps). A 16 amp load through current sense circuit 202 delivers a 5.0 volt control signal to control circuitry 203. The microcontroller is adapted to detect battery voltage variations as small as 60 millivolts (mV). The conductors (wires) of vehicular flasher unit 101 are sized to clear a 20 amps fuse. Note that the microcontroller uses the same A/D input to initially detect the battery voltage and subsequently also to detect actuations of user switch 334.

Power switch 205 makes use of transistor 318, specifically a high current P-type Metal-Oxide Field Effect Transistor (MOSFET) (T1), which is capable of reliably supplying 50 amps of current to the lamp load. This high current capability is required to quickly clear a 20 amp fuse in case the cable harness of left/right hand turn signal lamps 108/109 (FIG. 1) is accidentally shorted to the ground reference node. Transistor 324, specifically a low current N-type MOSFET (T2), is used to isolate the microcontroller from the +12 volt power source. Diodes 310 and 326 are surge protectors capable of suppressing up to 600 watt spikes greater than 20 volts. These voltage spikes are very short in duration therefore relatively low amount of heat is produced by the hazardous voltage spikes. Diodes 310 and 326 are generally used to protect circuits of vehicular flasher unit 101 from hazardous voltage spikes produced by the harsh automotive environment. Diode 316 is a 5-volt zener diode which is used to protect the input of the microcontroller from voltages higher than 5 volts.

As described earlier, vehicular flasher unit 101 produces a pre-selected ON-OFF flash sequence or scheme in response to detecting a predetermined signal from current sense circuit 202, which occurs when either the left/right hand turn signal switch or the emergency hazard switch is closed by actuation from the user. Memory 210 has a plurality of pulse width modulation (PWM) flasher scheme data sets stored therein which correspond to a plurality of flasher schemes for the lamps. Control circuitry 203 is operative to select a set of PWM flasher scheme data from the plurality of PWM flasher scheme data sets stored in memory 210 in accordance with input signals from user selection switch 334. In response to an actuation of one of the lamp switches (104, 106, or 107 of FIG. 1), control circuitry 203 controls power switch 205 to produce the PWM signals at the lamps for illuminating the selected ON-OFF flash sequence.

Each data item of the PWM flashing scheme data is a value that corresponds to "ON" time duration of the 5 to 10 ms pulse of the PWM signal. There are a plurality of data items of the PWM flash scheme data to produce the entire flasher scheme. For example, there may be between 100 and 200 data values of the PWM signal to provide for the appropriate resolution. Preferably, the frequency at which the PWM signal is generated is between, but not limited to, 100 and 200 Hz. When a lamp switch is activated, control circuitry 203 continually sequences through each data value of the PWM flash scheme data in a round robin fashion to produce each PWM pulse for producing the flasher scheme. Preferably, the set of PWM flasher scheme data is a set of PWM heartbeat scheme data corresponding to a heartbeat flashing scheme in the vehicle flasher light.

Figure 8:
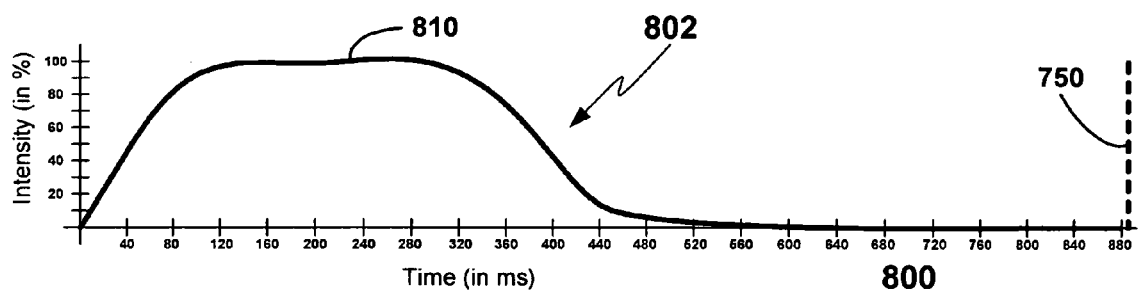
FIG. 8 is a graph of a standard flasher scheme which may be provided in the vehicle flasher light.

With use of PWM signals, vehicular flasher unit 101 is thus configured to control the intensity of either incandescent lamps or LEDs. LED-based turn signal lamps inherently have very fast turn-on and turn-off times, which results in a harsh visual effect if nothing is done to mitigate it. Using PWM, vehicular flasher unit 101 is adapted to soften the OFF-ON and ON-OFF transition of LED based signal lamps in an attempt to imitate the soft and pleasing OFF-ON and ON-OFF intensity transitions inherent in common incandescent lamps. The LED flashes are made to appear to have gradually increasing and decreasing intensities through use of PWM to imitate the turn-on and turn-off characteristics of incandescent lamps, whether standard flash patterns or other (heartbeat) patterns are utilized. See FIG. 8, where a graph 800 of a standard flash pattern signal 802 for an LED is shown as having a peak intensity 810 with gradual rise and fall times with use of PWM. This type of standard flash pattern signal 802 may be utilized as a user-selectable pattern in vehicular flasher unit 101. It is the PWM that provides the gradual rise and fall times of standard flash pattern signal 802, otherwise the signal would have very sharp rise and fall times.

Resistor 342 sets the operating frequency of the microcontroller to approximately 3 MHz. This frequency, in turn, controls the predetermined rate of the flasher sequence. Alternatively, resistor 342 of control circuitry 203 may be a potentiometer or potentiometer mechanism, which allows for an adjustment of the rate at which the turn signal cycles within a predetermined time period. The potentiometer may be entirely contained within the housing unit of vehicular flasher unit 101 or exposed (e.g. partially exposed) from the housing unit. This control allows the manufacturer or the vehicle operator to manually set a preference for a faster or slower flasher sequence.

As described earlier, when a flasher pattern is selected, control circuitry 203 measures the current of the turn signal lamps and stores a value proportional to this current in memory 210. This value is the voltage $V_{Im}$ which is measured by the A/D converter in the microcontroller. This stored value represents the operating condition when the turn signal bulbs are in good working order and properly functioning. When the microcontroller detects this value during steady-state operation, left/right hand turn signal switch 108/109 (FIG. 1) is being activated by the vehicle operator. In response, control circuitry 203 causes the user-selected flasher sequence to be produced. When vehicular flasher unit 101 detects a value that is greater than the stored measured value, then emergency hazard switch 104 (FIG. 1) is being activated by the vehicle operator. In response, control circuitry 203 causes the selected flasher sequence to be an emergency hazard flash sequence.

Figure 9:
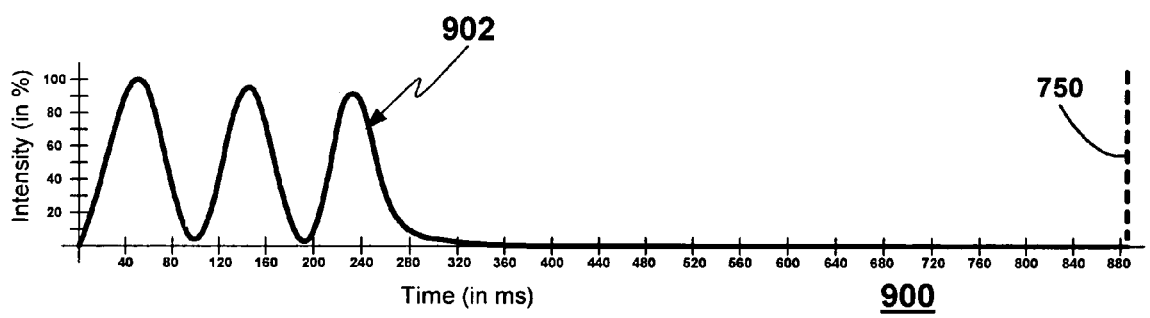
FIG. 9 is a graph of a battery saving emergency hazard flasher scheme which may be provided in the vehicle flasher light.

If the emergency hazard switch is closed for more than a predetermined time period (approximately 15 minutes), or the battery voltage is measured to be below +12.5 volts DC (or some other predetermined voltage), control circuitry 203 overrides the currently selected/enable flash pattern and causes a special battery saving flash pattern to be produced. This is done in order to extend the usable life of the battery. Control circuitry 203 causes this to happen by activating an event counter at the time the emergency hazard switch is activated which tracks the duration of the emergency hazard condition. This pattern switching is performed based on an assumption that, for example, the automobile has been abandoned for an extended period of time due to a mechanical failure. The battery saving flash pattern may be, for example, a series of rapid ON-OFF flash cycles followed by a longer off period. See, for example, FIG. 9 which shows a graph 900 of a battery saving flash pattern signal 902. In FIG. 9, there are three (3) rapid pulses in the battery saving flash pattern signal 902. The battery saving flash pattern reduces the power drain on the battery by the increased pause between the series of rapid ON-OFF flash cycle. As apparent, the battery saving flash pattern is associated with a lower average power than a standard or heartbeat flash pattern. If the automobile is disabled for an extended time period, the battery saving flash pattern will extend the available battery charge and provide an emergency flasher protection for a longer period of time. This battery saving/ emergency flash pattern is considered to be another added safety feature of vehicular flasher unit 101.

When a turn signal switch is activated, and a reduced current associated with the existing battery voltage is produced (i.e. a current substantially less than the initially-measured current), control circuitry 203 overrides the currently selected/enabled flash sequence and produces a "bulb out" flash sequence. As a common example of such detection, the initially measured current may be 4.4 amps for a properly working two lamp system (one front lamp and one rear lamp per side), and the reduced current may be 2.2 amps due to a lamp failure. The bulb out flash sequence is a standard 50% ON 50% OFF flash sequence (i.e. see FIG. 8) which cycles at approximately twice the standard cycling frequency, or approximately 500 ms rate. A "bulb out" audio alert is also provided from speaker 336 in response to such detection. These special signals are generated to encourage the vehicle operator to fix the bulb problem.

A specific example will be described for a four-bulb per side system with a 16 amp maximum load. The initially-measured voltage $V_{Im}$ stored in the microcontroller is about 1.4 volts for a two-bulb per side system. Steady-state operation with no significant activity is present when the voltage $V_{Im}$ is detected to be about 0 volts. When the microcontroller detects about 1.4 volts at the output, then the left/right hand turn signal switch has been activated and the pre-selected flasher pattern is produced in response. When the microcontroller detects about 2.8 volts at the output, then the emergency hazard signal switch has been activated and the emergency hazard signal pattern is produced in response. Note that each bulb accounts for about 0.7 volts. Therefore, when the microcontroller detects a voltage greater than 0.7 volts and less than 1.4 volts, then a left/right hand turn signal bulb has failed, and therefore a "bulb-out" flash pattern and an optional audible alert is produced in response. Note that for an eight bulb system (i.e. four bulbs per side), the detection techniques are the same as described above but the voltages utilized are essentially doubled (i.e. the threshold voltage for a four-bulb per side system is 2.8 volts compared to 1.4 volts for a two-bulb per side system).

Note that the above-specified stored threshold may be inaccurate if the battery voltage changes over time. Therefore, during the initial measuring and storage of the voltage $V_{Im}$, the microcontroller also measures and stores a value that is proportional to the battery voltage. During steady-state operation, the microcontroller uses this battery voltage measurement along with a real-time battery voltage measurement to adjust the threshold voltages accordingly for accurate detection. To illustrate, a typical battery voltage when the battery is fully charged is about 12.8 volts when the vehicle is not operating. However, this voltage may decrease to about 11.5 volts if the battery is not fully charged. When the vehicle is being operated, the battery voltage may increase up to 14.5 volts when minimal vehicle accessories are engaged. Therefore, the 1.4 volt threshold (or e.g. the 2.8 volt threshold for the four-bulb per side system) may be adjusted in accordance with the increase and decrease in battery voltage relative to the pre-stored battery voltage value.

Control circuitry 302 is also operative to produce a flasher "tick" sound at speaker 336. This is a sound that replicates the sound that vehicle operators are accustomed to hear when a turn signal is activated. Vehicular flasher unit 101 allows the user to select between several different tick sounds via user switch 334 to suit their preference. The volume of the ticking sound may also be adjusted or muted to suit the user's preference. Control circuitry 203 also automatically enables the ticking sound in response to a turn-signal on reminder event (enabled for a relatively long time), even if it is initially or previously set to the muted setting. Other alerts and acknowledgments may be produced by speaker 336 of output circuit 207. An acknowledgement sound is produced when a new flash sequence has been selected by the user. As another example, an audible warning alarm is produced when the turn signal is active for more than 256 flash sequences (or a predetermined time period). The "bulb out" audio alert is also provided as described.

Figure 4:
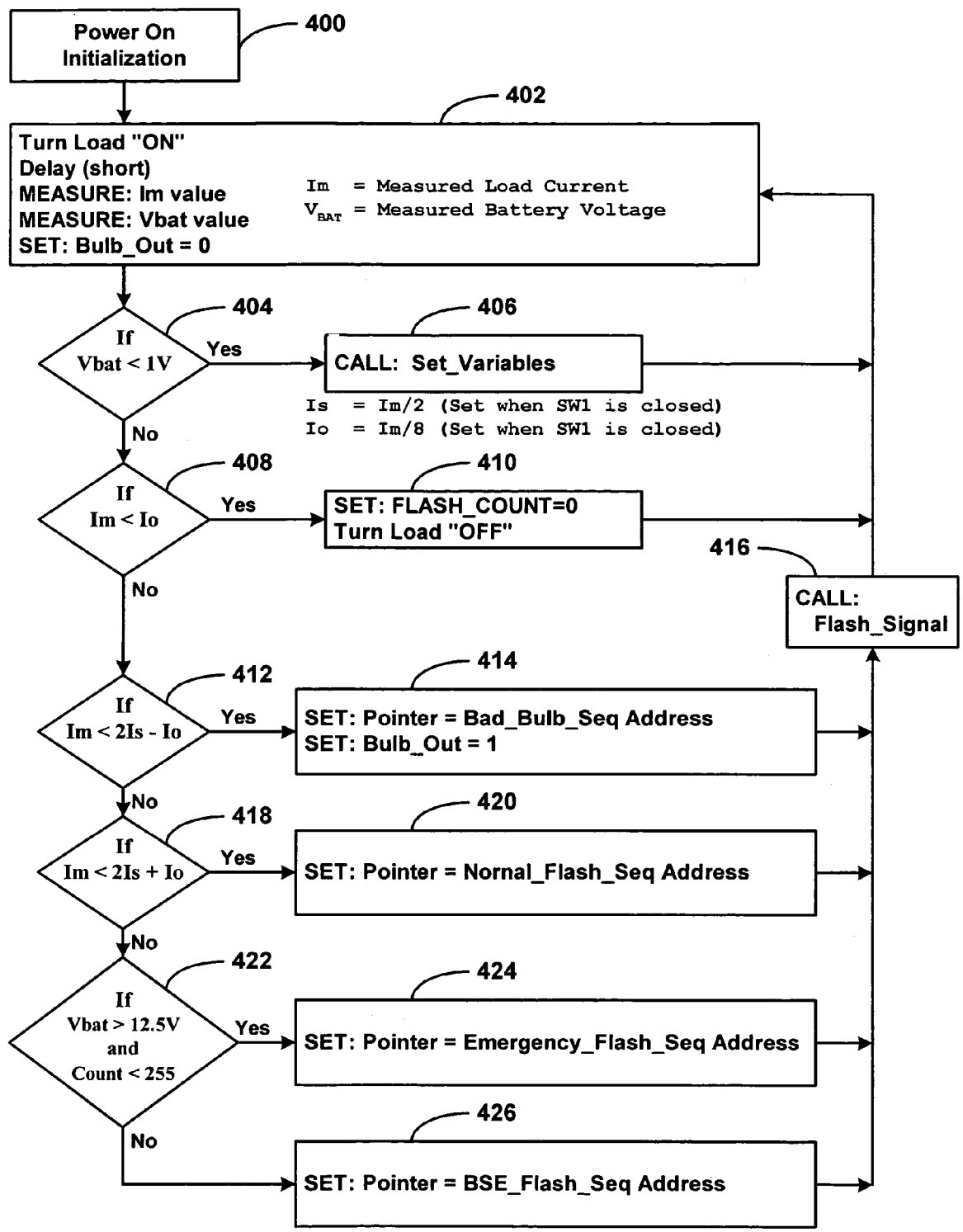
FIG. 4 is a flowchart of a general operating method for use in the vehicular flasher unit of FIGS. 1–3.

FIG. 4 is a flowchart of a general operating method for use in vehicular flasher unit 101 of FIGS. 1–3. This flowchart extends through FIG. 5 (a "Set_Variables" subroutine) and FIG. 6 (a "Flash_Signal" subroutine). Note that a computer program product of the present application includes a storage medium (e.g. computer memory) and computer instructions stored in the storage medium which are executable by one or more controllers or processors for executing the techniques of the present application as described.

When power is applied to the vehicular flasher unit 101, the controller 203 goes through a power on initialization sequence 400 of FIG. 4. The initialization sequence defines the microcontroller internal assets including the required input pins, output pins, and A/D converter input pins. Prior to this initialization sequence, all microprocessor pins are defined as inputs. Upon completion of the initialization sequence, program control is handed over to the main program loop. This main program loop has two primary functions. First, the microcontroller monitors for the closure of a turn signal or emergency hazard switch. Steps included in the monitoring routine include steps 402, 404, 408, and 410, repeating back to step 402. Second, when closure of a turn signal or emergency hazard switch occurs, the microcontroller determines which flash sequence needs to be executed, executes that flash sequence, and then loops back to step 402.

In step 402, switch 205 is enabled so that the lamp current $I_M$ and the battery voltage $V_{BAT}$ may be measured by the microcontroller. The "bulb out" status indicator (i.e. Bulb_Out) is set to "Bulbs OK" status (i.e. Bulb_Out=0). Next, the controller tests whether $V_{BAT}$ is less than one (1) volt, which indicates that the user switch has been actuated for selection of a flasher scheme or feature (identified in step 404 of FIG. 4). If so, then the microcontroller causes a "Set_Variables" subroutine to be called (step 406 of FIG. 4). In this subroutine, the microcontroller determines which feature is being activated by the user and sets it appropriately. Also, the subroutine defines and initializes a variable $I_S$ such that $I_S=I_M/2$ and a variable $I_O$ such that $I_O=I_M/8$. The "Set_Variables" subroutine is described in more detail later in relation to FIG. 5. If $V_{BAT}$ is not less than one volt at step 404, the controller proceeds to test whether $I_M$ is less than $I_O$, which indicates that both the turn signal and the emergency signal are inactive (step 408 of FIG. 4). If so, then the microcontroller causes the lamp load to be switched off and sets a FLASH_COUNT variable to zero (step 410 of FIG. 4) and loops back to step 402.

If $I_M$ is not less than $I_O$ in step 408, indicating that one of the turn signal or the emergency hazard switch has been activated, the controller proceeds to test whether $I_M$ is less than $2I_S-I_O$ which indicates a bulb failure condition (step 412 of FIG. 4). If so, the "bulb out" status is set to "bulb out" (i.e. Bulb_Out=1) and the flash pattern pointer is set to an address of the bulb out flash pattern in the memory (step 414 of FIG. 4). If not in step 418, the controller proceeds to test whether $I_M$ is less than $2I_S+I_O$, which indicates a turn signal lamp switch activation by the user (step 418 of FIG. 4). If so, the flash pattern pointer is set to the address of the pre-selected turn signal flash pattern in the memory (step 420 of FIG. 4). This normal flash pattern is the one selected from the "Set_Variables" subroutine. If not in step 418, indicating that the emergency hazard switch has been activated, the controller proceeds to test whether $V_{BAT}$ is greater than 12.5 volts DC (or other predetermined voltage), and whether the emergency flasher counter is less than 255 (step 422 of FIG. 4). If so, then the flash pattern pointer is set to the address of the emergency flash sequence pattern in the memory (step 424 of FIG. 4). If not in step 422, then the flash pattern pointer is set to the address of the battery saving emergency flash sequence pattern in the memory (step 426 of FIG. 4). After any of steps 414, 420, 424, and 426, the controller causes the "Flash_Signal" subroutine to be called (step 416 of FIG. 4) and then loops back to step 402 to start the process over again.

Figure 5:
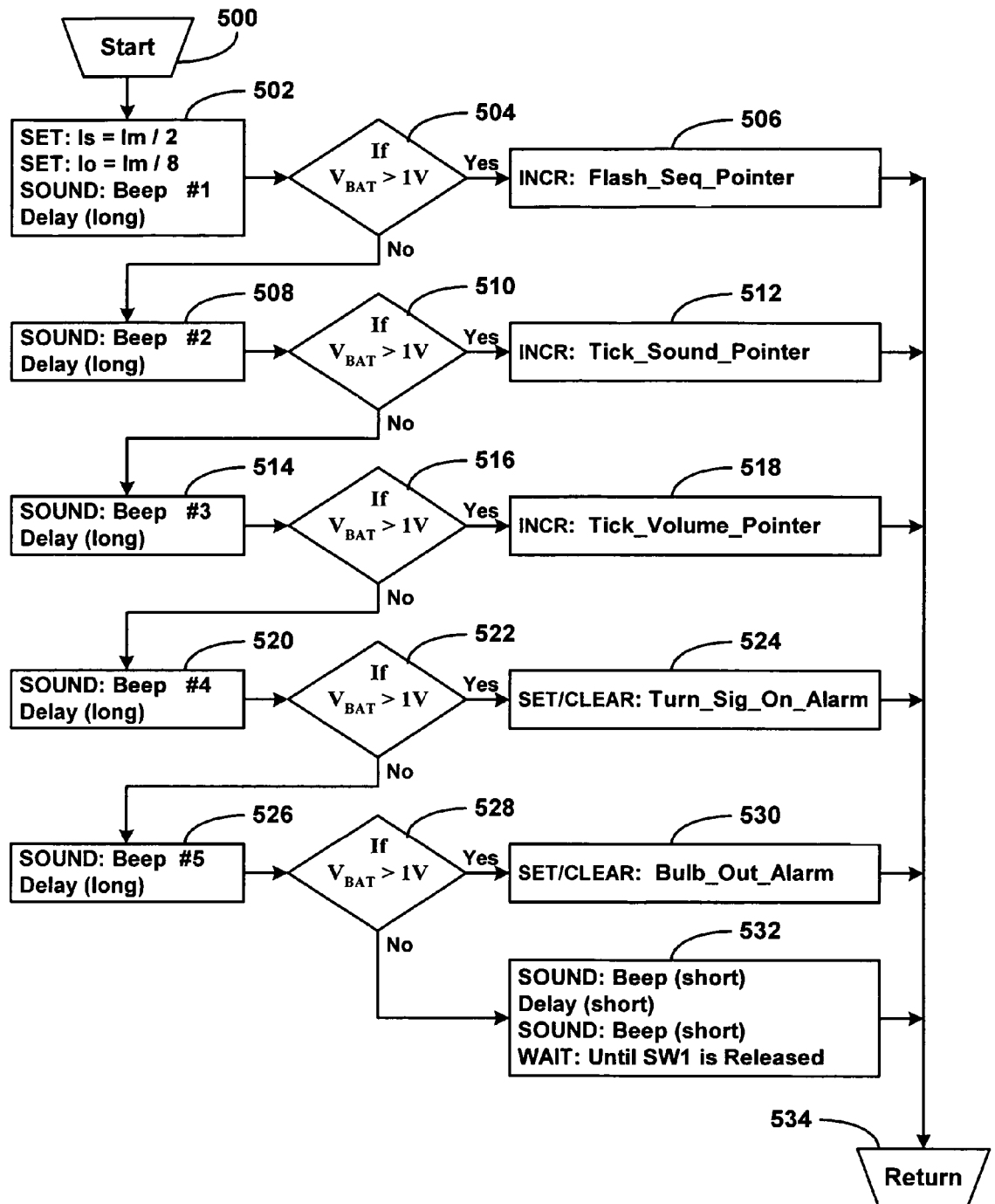
FIG. 5 is a flowchart of a method for use in identifying a flasher scheme selection input signal and, in response, selecting PWM flasher scheme data from memory for illuminating a flasher scheme in vehicle flasher lights ("Set_Variables" procedure of FIG. 4)

FIG. 5 is a flowchart of a method for use in identifying a flasher scheme selection input signal and, in response, selecting PWM flasher scheme data from memory for illuminating a flasher scheme in the vehicle flasher lights ("Set_Variables" 406 subroutine of FIG. 4). In general, this procedure identifies signals from the user switch to set/clear various features of the vehicular flasher unit in connection with an audio acknowledgment alerts. In this embodiment, the user switch is a single push button switch 334 (FIG. 3).

Beginning at a start block 500 of FIG. 5, the subroutine first defines and initializes the variable $I_S$ such that $I_S=I_M/2$ and the variable $I_O$ such that $I_O=I_M/8$ (step 502 of FIG. 5). Depressing the user switch 334 for a first time period and releasing the switch after a first audio alert is produced (steps 502 and 504 of FIG. 5) causes the microcontroller to increment the flash pattern pointer in the memory to change the current flash sequence to the next flash stored in memory (step 506 of FIG. 5). Similarly, depressing the user switch for a second time period (longer than the first time period) and releasing the user switch after a second audio alert is produced (steps 508 and 510 of FIG. 5) causes the microcontroller to increment the tick sound pointer in the memory to change the flasher tick sound to another different ticking sound stored in memory (step 512 of FIG. 5). Depressing the user switch for a third time period (longer than the second time period) and releasing the user switch after a third audio alert is produced (steps 514 and 516 of FIG. 5) will cause the microcontroller to increment a tick volume pointer in the memory to adjust the volume of the ticking sound (step 518 of FIG. 5). Depressing the user switch for a fourth time period (longer than the third time period) and releasing the user switch after a fourth audio alert is produced (steps 520 and 522 of FIG. 5), enables (or disables if enabled) the "Turn Signal On Reminder" alert (step 524 of FIG. 5). Depressing the user switch for a fifth time period (longer than the fourth time period) and releasing the user switch after a fifth audio alert is produced (steps 526 and 528 of FIG. 5), enables (or disables if enabled) the "Bulb Out" alert (step 530 of FIG. 5). If the user switch still remains depressed at step 528 of FIG. 5, additional audio alerts are produced and a delay to "do nothing" is provided until release of the user switch (step 532 of FIG. 5). The flowchart returns to the main process at return block 534 of FIG. 5.

Figure 6:
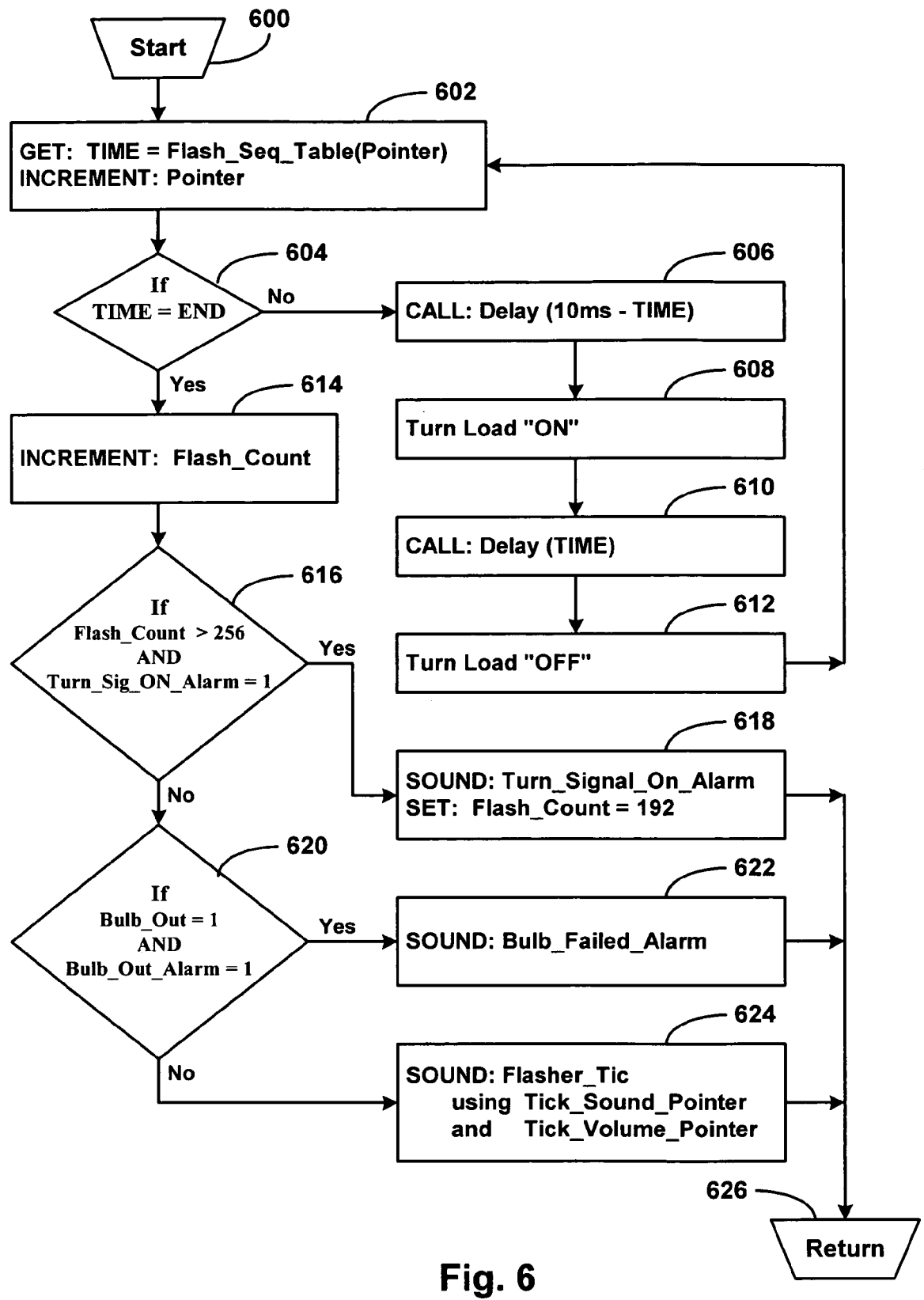
FIG. 6 is a flowchart of a method for use in producing output signals, such as pulse width modulated signals for illuminating a vehicle flasher light, from the vehicular flasher unit ("Flash_Signal" procedure of FIG. 4)

FIG. 6 is a flowchart of a method for use in producing output signals, such as pulse width modulated signals for illuminating a vehicle flasher light, from the vehicular flasher unit initiated by the "Flash_Signal" subroutine 416 of FIG. 4. This procedure is used to produce the various custom turn signal and/or emergency hazard flash sequences by retrieving stored "ON-Time" duty cycle time parameters from the "Flash_Seq_Table" to produce a PWM control signal which drives power switch 205 (FIGS. 2–3). Prior to entering the subroutine, note that an offset pointer address points to the next PWM data item (i.e. a time duration value for the "ON-Time" of the PWM period) of the selected set of PWM flasher scheme data. Note that the data set of the PWM scheme is made up of a predetermined number of hexadecimal "On-Time" values between "00h" and "FEh", concluded by an end-of-sequence marker "END" which is stored as the hexadecimal number "FFh". The "Flash_Signal" routine illuminates the vehicle flasher lights by pulse-width-modulating power switch 205 (FIGS. 2–3) output with the "On-Time" values retrieved from the stored data until the end-of-sequence marker "END" is reached (i.e. TIME=END).

Beginning at a start block 600 of FIG. 6, a time duration value is retrieved from the memory at the offset pointer address, which is an offset from the selected set of PWM flasher scheme data (step 602 of FIG. 6). If the retrieved TIME value is not the end-of-sequence marker "END", step 604 of FIG. 6, then the pulse of the PWM signal needs to be enabled. An "Off-Time" time delay is first produced, where the Delay=(10 ms–"On-time" duration value) (step 606 of FIG. 6). After the initial "Off-Time" delay period has expired, the lamp load is switched on (step 608 of FIG. 6) and another time delay, the "On-Time" delay, is produced (step 610 of FIG. 6). After this time delay, the lamp load is switched off (step 612 of FIG. 6). The flowchart then starts over again at step 602 of FIG. 6 to retrieve the next "On-Time" value until the end-of sequence marker "END" is reached.

When the end-of-sequence marker "END" is reached in step 604 of FIG. 6, then the microcontroller causes a Flash_Count counter to be incremented (step 614 of FIG. 6). Some alarm indicators may sound depending on the status of process flags. If a predetermined number of flash repetitions have been exceeded (e.g. if Flash_Count counter is greater than 256, or approximately 4 minutes), and the alarm enable/disable flag has been enabled by the user (e.g. Turn_Sign_ON_Alarm=1), then the microcontroller causes an alarm to be produced at the speaker (e.g. four beeps) and the Flash_Count counter is set back to 192 for 1 minute subsequent reminders (step 618 of FIG. 6). If neither of the conditions in step 616 of FIG. 6 is met, then the microcontroller proceeds to test whether a bulb failure condition exists (e.g. Bulb_Out=1) and the bulb out enable/disable flag has been enabled by the user (e.g. Bulb_Out_Alarm=1) (step 620 of FIG. 6). If so, the microcontroller then causes an a bulb failure alert to be produced (e.g. two beeps) (step 622 of FIG. 6). If neither of the conditions in step 620 of FIG. 6 are met, then the microcontroller causes a flasher tick sound to be produced depending on the status of the Tick_Sound_Pointer and the Tick_Volume_Pointer flags (step 624 of FIG. 6). After steps 618, 622, or 624 have completed, the flowchart returns to the main process at return block 626 of FIG. 6.

Figure 7:
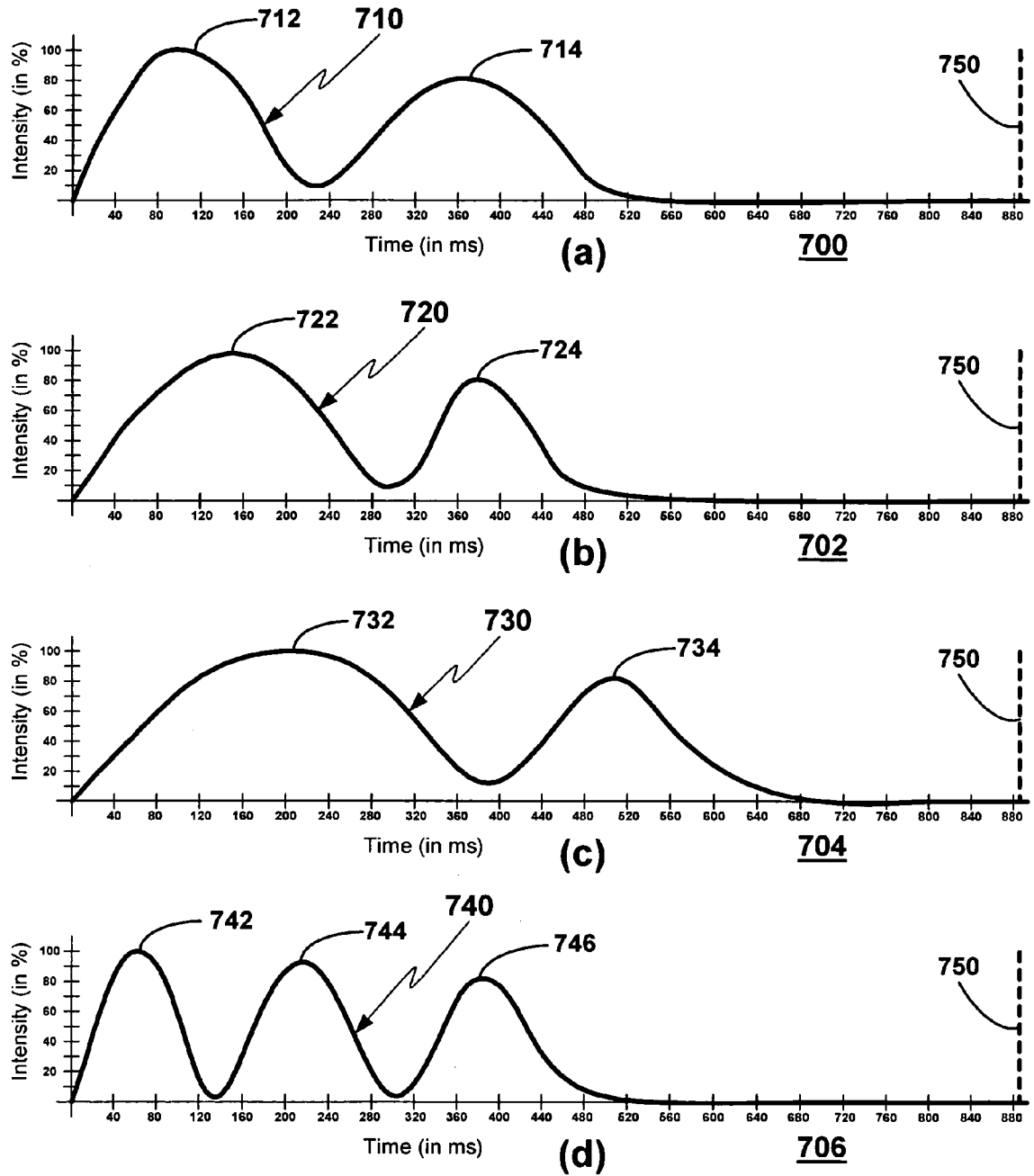
FIGS. 7(a)–7(d) are graphs of various heartbeat flasher schemes which may be provided in the vehicle flasher light.

FIGS. 7(*a*)–7(*d*) are graphs of a plurality of heartbeat or heartbeat-like flasher schemes for a vehicle flasher light. Each graph shows one period of a heartbeat signal in terms of a lamp intensity versus time. The intensity signals presented in the graphs are those which are detected from the lamp source or perceived by the human eye from the lamp, in contrast to those actual PWM signals received at the lamp.

In FIG. 7(*a*), a graph 700 shows a single period of a heartbeat pattern signal 710 of a heartbeat flasher scheme of the present application. Heartbeat pattern signal 710 may be utilized as a user-selectable pattern for left/right hand turn signaling. Heartbeat pattern signal 710 as shown in FIG. 7(*a*) represents a typical "heartbeat" having a first heartbeat pulse flash 712 and a second heartbeat pulse flash 714. Each flash 712 and 714 has a peak intensity which is reached over a very gradual rise time and falls with a very gradual decay time. As shown, first and second heartbeat pulse flashes 712 and 714 have different peak intensities and, in the present embodiment, first heartbeat pulse flash 712 has a peak intensity that is greater than the peak intensity of second heartbeat pulse flash 714. Alternatively, the peak intensity of second heartbeat pulse flash 714 is less than the peak intensity of first heartbeat pulse flash 712. Each flash 712 and 714 may be separated by a period of minimal or no lamp intensity. The lamp intensity is also minimal or negligible (if existing at all) after the decay of second heartbeat pulse flash 714 up until the end of the period of the heartbeat signal which is represented by a period end marker 750. After the period end marker 750 is completed, another heartbeat will be produced which is identical to the heartbeat signal of the period shown in FIG. 7(*a*). The heartbeat pattern or scheme is repeated continually until the signal switch (e.g. turn or emergency) is switched off by the user.

FIG. 7(*b*) is another graph 702 of one period of a heartbeat pattern signal 720 of a heartbeat flasher scheme. Heartbeat pattern signal 720 may also be utilized as a user-selectable pattern for left/right hand turn signaling. Heartbeat pattern signal 720 also represents a typical "heartbeat" having a first heartbeat pulse flash 722 and a second heartbeat pulse flash 724. Each flash 722 and 724 has a peak intensity which is reached over a very gradual rise time and falls with a very gradual decay time. Heartbeat pattern signal 720 is substantially the same as heartbeat pattern signal 710 of FIG. 7(*a*), except that first heartbeat pulse flash 722 of FIG. 7(*b*) has a slightly longer duration than first heartbeat pulse flash 712 of FIG. 7(*a*), second heartbeat pulse flash 724 of FIG. 7(*b*) has a slightly shorter duration than second heartbeat pulse flash 714 of FIG. 7(*a*), and the entire ON duration of heartbeat pattern signal 720 of FIG. 7(*b*) is slightly shorter than the ON duration of heartbeat pattern signal 710 of FIG. 7(*a*).

FIG. 7(*c*) is another graph 704 of one period of a heartbeat pattern signal 730 of a heartbeat flasher scheme. Heartbeat pattern signal 730 may also be utilized as a user-selectable pattern for left/right hand turn signaling, and represents a typical "heartbeat" having a first heartbeat pulse flash 732 and a second heartbeat pulse flash 734. Each flash 732 and 734 has a peak intensity which is reached over a very gradual rise time and falls with a very gradual decay time. Heartbeat pattern signal 730 is substantially the same as heartbeat pattern signal 710 of FIG. 7(*a*), except that first heartbeat pulse flash 732 of FIG. 7(*c*) has a longer duration than first heartbeat pulse flash 712 of FIG. 7(*a*), second heartbeat pulse flash 734 of FIG. 7(*c*) has a slightly longer duration than second heartbeat pulse flash 714 of FIG. 7(*a*), and the entire ON duration of heartbeat pattern signal 730 of FIG. 7(*c*) is longer than the ON duration of heartbeat pattern signal 710 of FIG. 7(*a*).

FIG. 7(*d*) is another graph 706 of one period of a heartbeat pattern signal 740 of a heartbeat flasher scheme. Heartbeat pattern signal 740 represents an alternative "heartbeat" pattern which may be utilized as an emergency hazard signal. Heartbeat pattern signal 740 has a first heartbeat pulse flash 742, a second heartbeat pulse flash 744, and a third heartbeat pulse flash 746. Each flash 742, 744, and 746 has a peak intensity which is reached over a very gradual rise time and falls with a very gradual decay time. Heartbeat pattern signal 730 has flashes 742, 744, and 746 which are much shorter in duration than flashes 712 and 714 of heartbeat pattern signal 710 of FIG. 7(*a*), although the entire ON duration of heartbeat pattern signal 740 is about the same as the ON duration of heartbeat pattern signal 710 of FIG. 7(*a*).

As described earlier, a plurality of pulse width modulation (PWM) flasher scheme data sets are stored in memory. These PWM flasher scheme data sets correspond to a plurality of flasher schemes for the vehicle flasher light. The control circuitry is operative to select a set of PWM flasher scheme data from the plurality of PWM flasher scheme data sets stored in the memory in accordance with an input signal identified at the user switch input. The control circuitry produces, in response to identifying a flasher enable signal at the flasher enable input, a pulse width modulated signal in accordance with the selected set of PWM flashing scheme data for illuminating a flasher scheme in the vehicle flasher light. Each data item of the PWM flashing scheme data is a value that corresponds to the "ON" time duration of the 5 to 10 ms pulse of the PWM signal. There are a plurality of data items of the PWM flash scheme data to produce the entire flasher scheme. For example, there may be between 100 to 200 data values of the PWM signal to provide for the appropriate resolution. Preferably, the frequency at which the PWM signal is generated is between, and not limited to, 100 and 200 Hz. When a lamp switch is activated, the control circuitry continually sequences through each data value of the PWM flash scheme data in a round robin fashion to produce each PWM pulse for producing the flasher scheme. Preferably, but not limited to, the set of PWM flasher scheme data is a set of PWM heartbeat scheme data corresponding to a heartbeat flashing scheme in the vehicle flasher light.

As described herein, a vehicular flasher unit has control circuitry; memory which is accessible by the control circuitry and having a plurality of pulse width modulation (PWM) flasher scheme data sets stored therein which correspond to a plurality of flasher schemes for a vehicle flasher light; a flasher scheme selection input to the control circuitry; a flasher enable input to the control circuitry which enables a flasher scheme in the vehicular flasher light; and a light illumination output from the control circuitry which controls illumination of the vehicle flasher light. Flasher enable signals at the flasher enable input may be driven by a current sense circuit for detecting different lamp load currents which correspond to different switch actuations and/or status conditions (e.g. actuation of left/right hand turn signal switch, emergency hazard signal switch, or "bulb out" conditions). The control circuitry is operative to select a set of PWM flasher scheme data from the plurality of PWM flasher scheme data sets stored in the memory in accordance with a flasher scheme selection input signal identified at the flasher scheme selection input; monitor the flasher enable input to identify a flasher enable signal; and produce, at the light illumination output in response to identifying a flasher enable signal at the flasher enable input, a pulse width modulated signal in accordance with the selected and stored set of PWM flashing scheme data for illuminating a flasher scheme in the vehicle flasher light.

Preferably, the set of PWM flasher scheme data is a set of PWM heartbeat scheme data corresponding to a heartbeat flashing scheme in the vehicle flasher light. The heartbeat flashing scheme is a repeating sequence of two pulse flashes in the vehicle flasher lights which include a first-half heartbeat pulse flash and a second-half heartbeat pulse flash. Each first-half heartbeat pulse flash has a first intensity in the vehicle flasher lights and each second-half heartbeat pulse flash having a second intensity in the vehicle flasher lights that is different from (e.g. less than) the first intensity. Each first-half heartbeat pulse flash is separated from each subsequent second-half heartbeat pulse flash by a first duration and each second-half heartbeat pulse flash is separated from each subsequent first-half heartbeat pulse by a second duration that is different from (e.g. greater than) the first duration. However, the set of PWM flasher scheme data stored in memory is not limited to the above-mentioned PWM heartbeat flasher scheme; a variety of distinctive user selectable PWM flasher schemes may be stored in the memory.

As described, flasher enable signals at the flasher enable input may be driven by a current sense circuit for detecting different lamp load currents which correspond to different switch actuations and/or status conditions (e.g. actuation of left/right hand turn signal switch, emergency hazard signal switch, or "bulb out" conditions). Here, the control circuitry is operative to store a threshold value corresponding to a measured current through the vehicle flasher lights; after storing the threshold value, monitor an input voltage value at the flasher enable input; and identify the flasher enable signal at the flasher enable input based on a comparison of the input voltage and the threshold value. The flasher enable signal may be a left/right hand turn signal when the input voltage comprises a first input voltage; an emergency hazard turn signal when the input voltage comprises a second input voltage; and a bulb out signal when the input voltage comprises a third input voltage. The battery voltage may be used to adjust the threshold voltage used for switch detection. Here, the control circuitry is further operative to store an initial threshold value corresponding to a measured current through the vehicle flasher lights; store an initial battery voltage value of a battery of the vehicle; and after storing the initial threshold value and the initial battery voltage value; monitor an input voltage value at the flasher enable input; monitor a battery voltage value; produce a threshold value based on the initial threshold value, the initial battery voltage value, and the battery voltage value; and identify the flasher enable signal at the flasher enable input based on a comparison of the input voltage and the threshold value.

A computer program product of the present application includes a storage medium (e.g. computer memory) and computer instructions stored in the storage medium which are executable by one or more controllers or processors for executing the techniques of the present application as described. A vehicle such as an automobile of the present application includes a vehicular flasher unit which is adapted for coupling to vehicle flasher lights and a battery of the vehicle, and operates as described above.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in controlling illumination of vehicle flasher lights in accordance with a pre-programmed flasher scheme, the method comprising the acts of:
   providing a vehicular flasher unit with a memory which has a set of pulse width modulation (PWM) flasher scheme data stored therein;
   monitoring a flasher enable input to identify a flasher enable signal; and
   producing, at a light illumination output in response to identifying the flasher enable signal, a pulse width modulated signal in accordance with the selected set of PWM flashing scheme data for illuminating a flasher scheme in the vehicle flasher lights.

2. The method of claim 1, wherein the act of producing the pulse width modulated signal comprises the further acts of:
   reading one of a plurality of PWM data items of the set of PWM flasher scheme data selected from the memory;
   producing, at the light illumination output, a pulse having a duration which corresponds to the PWM data item; and
   repeating the acts of reading and producing a pulse for each one of the PWM data items of the set of PWM flasher scheme data for producing the pulse width modulated signal for illuminating the flasher scheme in the vehicle flasher lights.

3. The method of claim 1, wherein the set of PWM flasher scheme data comprises PWM heartbeat scheme data corresponding to a heartbeat flashing scheme in the vehicle flasher lights.

4. The method of claim 1, wherein the set of PWM flasher scheme data comprises PWM heartbeat scheme data corresponding to a heartbeat flashing scheme in the vehicle flasher lights, the heartbeat flashing scheme comprising a repeating sequence of two heartbeat pulse flashes in the vehicle flasher lights including a first heartbeat pulse flash and a second heartbeat pulse flash, each first heartbeat pulse flash having a first intensity in the vehicle flasher lights and each second heartbeat pulse flash having a second intensity in the vehicle flasher lights that is different from the first intensity.

5. The method of claim 1, wherein the set of PWM flasher scheme data comprises PWM heartbeat scheme data corresponding to a heartbeat flashing scheme in the vehicle flasher lights, the heartbeat flashing scheme comprising a repeating sequence of two heartbeat pulse flashes in the vehicle flasher lights which include a first heartbeat pulse flash and a second heartbeat pulse flash, each first heartbeat pulse flash having a first intensity in the vehicle flasher lights and each second heartbeat pulse flash having a second intensity in the vehicle flasher lights that is different from the first intensity, each first heartbeat pulse flash being separated from each subsequent second heartbeat pulse flash by a first duration and each second heartbeat pulse flash being separated from each subsequent first heartbeat pulse by a second duration that is different from the first duration.

6. The method of claim 1, wherein the set of PWM flasher scheme data comprises PWM heartbeat scheme data corresponding to a heartbeat flashing scheme in the vehicle flasher lights, the heartbeat flashing scheme comprising a repeating sequence of two heartbeat pulse flashes in the vehicle flasher lights which include a first heartbeat pulse flash and a second heartbeat pulse flash, each first heartbeat pulse flash having a first intensity in the vehicle flasher lights and each second heartbeat pulse flash having a second intensity in the vehicle flasher lights that is less than the first intensity, each first heartbeat pulse flash being separated from each subsequent second heartbeat pulse flash by a first duration and each second heartbeat pulse flash being separated from each subsequent first heartbeat pulse by a second duration that is greater than the first duration.

7. The method of claim 1, wherein the memory has a plurality of PWM flasher scheme data sets stored therein, each PWM flasher scheme data sets corresponding to one of a plurality of flasher schemes for the vehicle flasher lights, the method further comprising the acts of:
   monitoring to identify a flasher scheme selection input signal at a flasher scheme selection input; and
   selecting one of the sets of PWM flasher scheme data from the memory which corresponds to a flasher scheme selection input signal identified at the flasher scheme selection input.

8. The method of claim 1, further comprising:
   storing a threshold value corresponding to a measured current through the vehicle flasher lights;
   after storing the threshold value, monitoring an input voltage value at the flasher enable input; and
   identifying the flasher enable signal at the flasher enable input based on a comparison of the input voltage and the threshold value.

9. A vehicular flasher unit, comprising:
   control circuitry;
   memory which is accessible by the control circuitry and having a plurality of pulse width modulation (PWM) flasher scheme data sets stored therein which correspond to a plurality of flasher schemes for vehicle flasher lights of a vehicle;
   a flasher scheme selection input to the control circuitry;
   a flasher enable input to the control circuitry which enables a flasher scheme in the vehicular flasher lights;
   a light illumination output from the control circuitry which controls illumination of the vehicle flasher lights;
   the control circuitry being operative to:
      select a set of PWM flasher scheme data from the plurality of PWM flasher scheme data sets stored in the memory in accordance with a flasher scheme selection input signal identified at the flasher scheme selection input;
      monitor the flasher enable input to identify a flasher enable signal; and
      producing, at a light illumination output in response to identifying a flasher enable signal, a pulse width modulated signal in accordance with the selected set of PWM flashing scheme data for illuminating a flasher scheme in the vehicle flasher lights.

10. The vehicular flasher unit of claim 9, wherein the control circuitry is operative to produce the pulse width modulated signal by being further operative to:
    read one of a plurality of PWM data items of the set of PWM flasher scheme data selected from the memory;
    produce, at the light illumination output, a pulse having a duration which corresponds to the PWM data item; and
    repeat the reading and producing a pulse for each one of the PWM data items of the set of PWM flasher scheme data for producing the pulse width modulated signal.

11. The vehicular flasher unit of claim 9, wherein the set of PWM flasher scheme data comprises PWM heartbeat scheme data corresponding to a heartbeat flashing scheme in the vehicle flasher lights.

12. The vehicular flasher unit of claim 9, wherein the set of PWM flasher scheme data comprises PWM heartbeat scheme data corresponding to a heartbeat flashing scheme in the vehicle flasher lights, the heartbeat flashing scheme comprising a repeating sequence of two heartbeat pulse flashes in the vehicle flasher lights which include a first heartbeat pulse flash and a second heartbeat pulse flash, each first heartbeat pulse flash having a first intensity in the vehicle flasher lights and each second heartbeat pulse flash having a second intensity in the vehicle flasher lights that is different from the first intensity, each first heartbeat pulse flash being separated from each subsequent second heartbeat pulse flash by a first duration and each second heartbeat pulse flash being separated from each subsequent first heartbeat pulse by a second duration that is different from the first duration.

13. The vehicular flasher unit of claim 9, further comprising:
a user switch coupled to the flasher scheme selection input;
wherein the control circuitry is further operative to:
monitor to identify a flasher scheme selection input signal at a flasher scheme selection input; and
select a set, of PWM flasher scheme data from the memory which corresponds to a flasher scheme selection input signal identified at the flasher scheme selection input.

14. The vehicular flasher unit of claim 9, wherein the control circuitry is further operative to:
store a threshold value corresponding to a measured current through the vehicle flasher lights;
after storing the threshold value, monitor an input voltage value at the flasher enable input; and
identify the flasher enable signal at the flasher enable input based on a comparison of the input voltage and the threshold value.

15. The vehicular flash unit of claim 9, wherein the control circuitry is further operative to:
store a threshold value corresponding to a measured current through the vehicle flasher lights;
after storing the threshold value, monitor an input voltage value at the flasher enable input;
identify the flasher enable signal at the flasher enable input based on a comparison of the input voltage and the threshold value;
wherein the flasher enable signal comprises a left/right hand turn signal when the input voltage comprises a first input voltage; and
wherein the flasher enable signal comprises an emergency hazard turn signal when the input voltage comprises a second input voltage greater than the first input voltage.

16. The vehicular flasher unit of claim 9, further comprising:
a speaker coupled to the control circuitry; and
wherein the control circuitry is further operative to produce an audible signal at the speaker.

17. A vehicular flasher unit, comprising:
control circuitry;
memory which is accessible by the control circuitry and having a plurality of pulse width modulation (PWM) flasher scheme data sets stored therein which correspond to a plurality of flasher schemes for vehicle flasher lights of a vehicle;
a flasher scheme selection input to the control circuitry;
a flasher enable input to the control circuitry which enables a flasher scheme in the vehicular flasher lights;
a light illumination output from the control circuitry which controls illumination of the vehicle flasher lights;
the control circuitry being operative to:
monitor the flasher enable input to identify a flasher enable signal;
producing, at a light illumination output in response to identifying a flasher enable signal, a pulse width modulated signal in accordance with a selected set of PWM flashing scheme data for illuminating a flasher scheme in the vehicle flasher lights;
wherein the set of PWM flasher scheme data comprises PWM heartbeat scheme data corresponding to a heartbeat flashing scheme in the vehicle flasher lights;
the heartbeat flashing scheme comprising a repeating sequence of two heartbeat pulse flashes in the vehicle flasher lights including a first heartbeat pulse flash and a second heartbeat pulse flash;
each first heartbeat pulse flash of the heartbeat flashing scheme having a first intensity in the vehicle flasher lights and each second heartbeat pulse flash having a second intensity in the vehicle flasher lights that is different from the first intensity; and
each first heartbeat pulse flash of the heartbeat flashing scheme being separated from each subsequent second heartbeat pulse flash by a first time duration and each second heartbeat pulse flash being separated from each subsequent first heartbeat pulse by a second time duration that is greater than the first time duration.

18. The vehicular flasher unit of claim 17, wherein the control circuitry is operative to produce the pulse width modulated signal by being further operative to:
read one of a plurality of PWM data items of the set of PWM flasher scheme data selected from the memory;
produce, at the light illumination output, a pulse having a duration which corresponds to the PWM data item; and
repeat the reading and producing a pulse for each one of the PWM data items of the set of PWM flasher scheme data for producing the pulse width modulated signal.

19. The vehicular flasher unit of claim 17, further comprising:
a user switch coupled to the flasher scheme selection input;
wherein the control circuitry is further operative to:
monitor to identify a flasher scheme selection input signal at a flasher scheme selection input; and
select a set of PWM flasher scheme data from the memory which corresponds to a flasher scheme selection input signal identified at the flasher scheme selection input.

20. The vehicular flasher unit of claim 17, wherein the control circuitry is further operative to:
store a threshold value corresponding to a measured current through the vehicle flasher lights;
after storing the threshold value, monitor an input voltage value at the flasher enable input;
identify the flasher enable signal at the flasher enable input based on a comparison of the input voltage and the threshold value;
wherein the flasher enable signal comprises a left/right hand turn signal when the input voltage comprises a first input voltage; and
wherein the flasher enable signal comprises an emergency hazard turn signal when the input voltage comprises a second input voltage greater than the first input voltage.

21. The vehicular flasher unit of claim 17, wherein the control circuitry is further operative to:

store a threshold value corresponding to a measured current through the vehicle flasher lights;

after storing the threshold value, monitor an input voltage value at the flasher enable input;

identify the flasher enable signal at the flasher enable input based on a comparison of the input voltage and the threshold value;

wherein the flasher enable signal comprises a left/right hand turn signal when the input voltage comprises a first input voltage;

wherein the flasher enable signal comprises an emergency hazard turn signal when the input voltage comprises a second input voltage; and wherein the flasher enable signal comprises a bulb out signal when the input voltage comprises a third input voltage.

22. The vehicular flasher unit of claim 17, wherein the control circuitry is further operative to:

store an initial threshold value corresponding to a measured current through the vehicle flasher lights;

after storing the initial threshold value:

monitor an input voltage value at the flasher enable input;

identify the flasher enable signal at the flasher enable input based on a comparison of the input voltage and the initial threshold value;

wherein the flasher enable signal comprises a left/right hand turn signal when the input voltage comprises a first input voltage;

wherein the flasher enable signal comprises an emergency hazard turn signal when the input voltage comprises a second input voltage; and wherein the flasher enable signal comprises a bulb out signal when the input voltage comprises a third input voltage.

23. The vehicular flasher unit of claim 17, wherein the control circuitry is further operative to:

store an initial threshold value corresponding to a measured current through the vehicle flasher lights;

after storing the initial threshold value:

monitor an input voltage value at the flasher enable input;

monitor a battery voltage value;

identify the flasher enable signal at the flasher enable input based on a comparison of the input voltage and the initial threshold value; and wherein the flasher enable signal comprises a battery saving signal when the battery voltage value is less than a predetermined voltage value.

24. The vehicular flasher unit of claim 17, wherein the control circuitry is further operative to:

store an initial threshold value corresponding to a measured current through the vehicle flasher lights;

store an initial battery voltage value of a battery of the vehicle;

after storing the initial threshold value and the initial battery voltage value:

monitor an input voltage value at the flasher enable input;

monitor a battery voltage value;

produce a threshold value based on the initial threshold value, the initial battery voltage value, and the battery voltage value; and identify the flasher enable signal at the flasher enable input based on a comparison of the input voltage and the threshold value.

* * * * *